United States Patent Office 2,750,077
Patented June 12, 1956

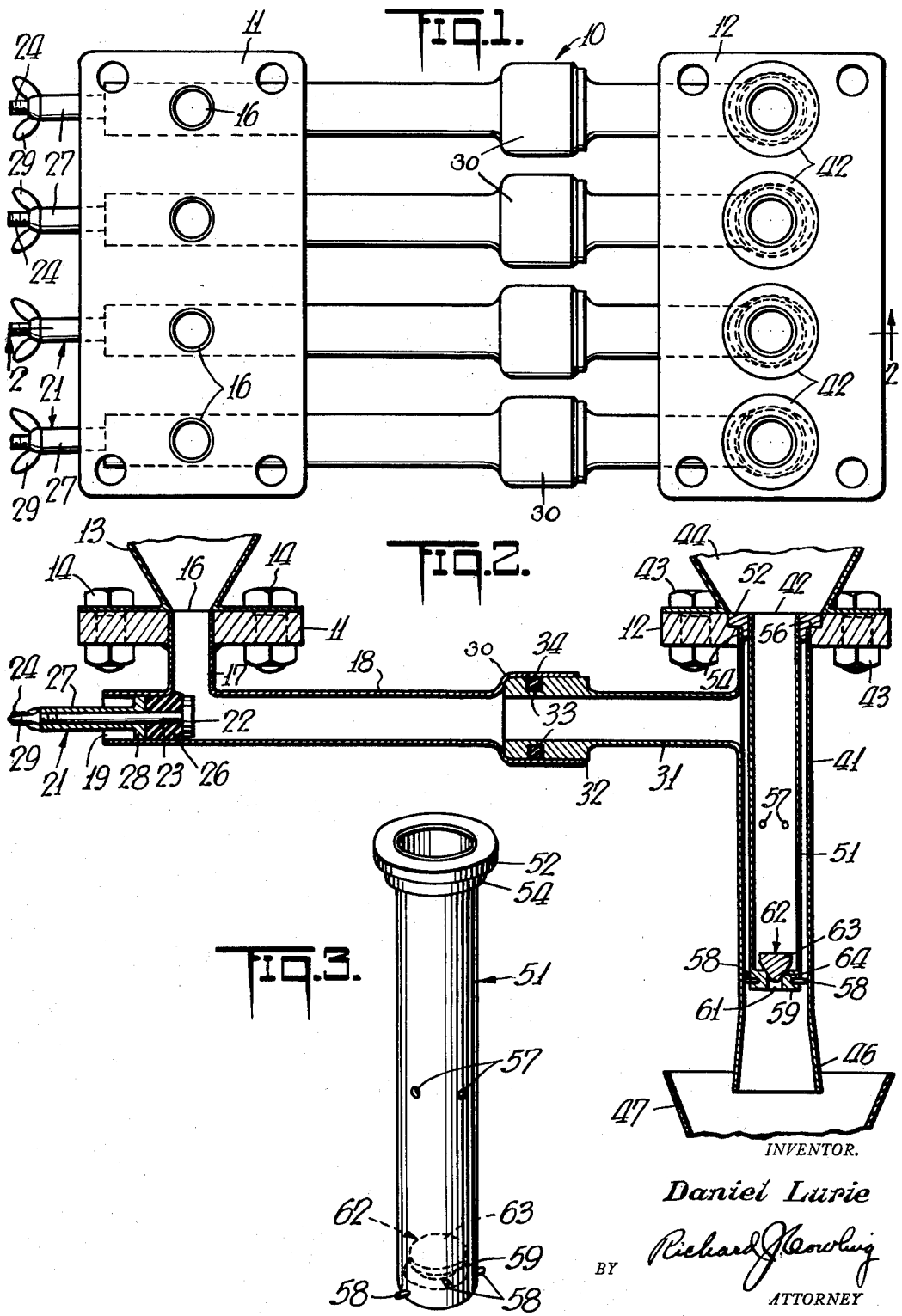

2,750,077

FILLING NOZZLE ATTACHMENT

Daniel Lurie, New York, N. Y., assignor to Joe Lowe Corporation, New York, N. Y., a corporation of Delaware Application January 11, 1954, Serial No. 403,280

4 Claims. (Cl. 222—135)

The present invention relates generally to apparatus for making variegated ice cream and the like substances, and it has particular relation to a filling nozzle attachment for conventional cup filling machines for injecting a contrasting flavoring material into a base ice cream substance for filling the multiple cavities of a conventional frozen confection mold.

There are many different types of nozzles for making variegated ice cream and the like substances, but most of them are designed for use with one or more conventional continuous freezers for filling bulk and packaged items. With the present invention, there is provided a filling nozzle attachment for a conventional cup filling machine capable of handling two different and contrasting materials, whereby variegated ice cream and the like substances may be made from said machines and distributed directly into the individual cavities of a conventional frozen confection mold, thereby permitting the manufacture of variegated frozen confections with standard equipment to be found in every up-to-date ice cream plant.

An object of the present invention is to provide a novel, efficient and inexpensive nozzle attachment for cup filling machines capable of handling two materials, which may be easily attached ad detached from said machines.

Another object of the invention is the provision of a sanitary nozzle, which is easily and quickly assembled and disassembled for cleaning purposes.

A further object of the invention is the provision of a filling nozzle attachment for cup filling machines handling two different materials for making variegated frozen confections in standard molds which permits the assembly and reassembly of one-half of the attachment at a time, whereby a change in one of the materials may be made from time to time without requiring a complete assembly and disassembly of the entire nozzle for cleaning purposes.

Various other and further objects and advantages of the invention, which result in simplicity, economy and efficiency, will be apparent from the following detailed description, wherein a preferred form of embodiment of the invention is shown, reference being had for illustrative purposes to the accompanying drawing, forming a part hereof, in which:

Figure 1 is a top plan view of an assembled nozzle attachment made in accordance with the principles of the invention;

Figure 2 is a longitudinal sectional view of the nozzle attachment shown in Figure 1, the same having been taken substantially along the line 2—2 thereof; looking in the direction of the arrows, and also showing the manner in which the assembly is attached to the bottoms of the hoppers of a conventional cup filling machine which provides the filling pressures and sources of supply; and Figure 3 is an enlarged perspective view of the removable insert tube mounted in the large delivery tube for dispersing the contrasting flavoring material throughout the basic substance.

It will be noted that each of the mounting plates 11 and 12 has four spaced inlet openings through which the respective materials are received. The number and spacing of such openings may be varied at will depending upon the conditions under which the attachment is to be used. In the present invention and illustrations, the attachment nozzle 10 has been designed for use in filling the individual cavities of a conventional frozen stick confection mold, which contains four laterally spaced rows of six individual cavities each, which rows are spaced so that one inlet opening will be centrally over one cavity of each row as the mold is passed therebelow.

The mounting plate 11 is designed to be attached to the bottom of a hopper 13 by means of suitable bolts and nuts 14, as best shown in Figure 2. Each of the inlet openings 16, extending vertically through the mounting plate 11, has a short depending receiving tube 17 mounted fixedly therein, as by welding, etc. Each tube 17 is, in turn, formed integrally with a longitudinally extending horizontal tube 18 at a point spaced intermediate the ends thereof. The short ends of the tubes 18 have an open end 19, each of which is adapted to receive an adjustable plug valve 21 for varying the rate of flow of the basic material from the receiving tube 17 into the horizontal tube 18 by restricting the opening therebetween.

Each plug valve 21 is made in a sanitary manner whereby it may be easily and quickly removed from its open end 19 of its tube 18 for cleaning purposes. Each valve 21 consists of a metal cylinder base member 22 having a diameter substantially equal to the inner diameter of the tube 18. A rod 23 is mounted axially of one side of the base member 22. The rod 23 is of a substantial length and has its outer free end threaded, as indicated at 24. A cylindrically shaped expansion ring 26 is mounted axially over the rod 23 adjacent the base member 22, and is made of rubber or plastic of the type approved for sanitary fittings by various health authorities. A tubular sleeve 27, having a base ring 28 corresponding in size substantially to the base member 22, is adapted to be mounted over the rod 23 so that its threaded free end projects therefrom. A wing nut 29 is adapted to be mounted on the threaded end 24 of the rod 23. When the wing nut 29 is adjacent the outer free ends of the threaded portion 24, the assembled valve 21 will slide freely inside of the tube 18, but when the wing nut 29 is threaded down on the rod 23, forcing the ring 28 towards the base member 22, the resilient ring 26 is expanded radially, as best shown in Figure 2, by compression between the base member 22 and the ring 28, whereby it is secured frictionally in a fixed position within the horizontal tube 18. By varying the position of the plug valve 21 with respect of the communicating opening between the tubes 17 and 18, it is possible to control accurately the flow of basic substance from the hopper 13 into the tube 18. The opposite or delivery end of each of the longitudinal tubes 18 is enlarged for a short distance adjacent its end, as indicated at 30, to provide receiving means for a sanitary connection with a tube 31, having an enlarged outside diameter substantially equal to the inside diameter of the enlarged section 30 of the tube 18. The enlarged free ends 32 of the tubes 31 have a thicker wall structure than the remainder of the tube for providing an annular recess 33 for receiving a sanitary plastic or rubber sealing gasket 34, which insures a readily separable leak-proof telescopic joint between the enlarged sections 30 and 32 of the tubes 18 and 31, respectively.

The delivery end of each of the tubes 31 is in open communication intermediate the ends of an enlarged vertically extending discharge tube 41. The upper ends of each of the tubes 41 are welded or otherwise secured permanently in the receiving openings 42 of the attaching plate 12, which, in turn, is adapted to be secured by nuts and bolts 43 to the bottom of a hopper 44 of a conventional cup filling machine. This hopper 44 is adapted to receive a quantity of flavoring material, such as chocolate syrup, which is of a contrasting color to the basic substance being dispensed from the hopper 13, as for example, vanilla ice cream and the like substances. The lower or depending free ends of each of the vertical tubes 41 projects a substantial distance below the junction of the lateral tube 31, and has its lower delivery end enlarged or flared, as indicated at 46, to facilitate delivery into the open top cavities of a conventional mold when the same is positioned therebelow.

An insert tube 51, having a seating ring 52 mounted around its upper end is provided with a reduced shoulder section 54, which is adapted to engage a correspondingly recessed shoulder 56 formed in each of the inlet openings 42, as best shown in Figure 2. Each insert tube 51 is provided with a series of circumferentially spaced radial openings 57 intermediate its ends, and its lower end is provided with a series of radial projections 58 mounted circumferentially at 90 degree intervals. The projections 58 are designed to engage the inner surfaces of the tube 41, whereby the lower end of the insert tube 51 is maintained axially in spaced alignment within the receiving tube 41. The lower end of the discharge tube 51 is also provided with a base member 59, having an axial opening 61 therethrough. The base member 59 is welded or otherwise secured to the inner surface of the discharge tube 51. A removable plug member 62, having an enlarged top portion 63, which is slightly smaller in diameter than the inner diameter of the tube 51, is provided with a tapering shank portion 64, whose lower end is of a diameter to be received within the axial opening 61. This construction permits the rapid assembly and reassembly of the assembled tubes 41 and 51 for cleaning purposes at the end of each day or when a change in material is desired, or when a different type of confection is to be made such as shown in my co-pending application Serial No. 403,279 filed on even date herewith, without requiring tools of any kind.

In the operation of the attachment apparatus for the formation of variegated ice cream or similar substances from a conventional double hopper cup filling machine, whereby it is desired to disperse a flavoring material having a contrasting color into a basic substance in a given ratio, it will be understood that the materials from the receiving hoppers 13 and 44 are delivered into their respective receiving tubes 17 and 51 under synchronized and even and intermittent pressures. It is necessary to provide intermittent pressure in order to permit movement of the mold structure to remove a filled mold cavity and replace it with an unfilled cavity.

The amount of basic substance passing from the hopper 13 into the tube 17 and then into and through the tube 18 is controlled by the position of the plug valve 21. The basic substance passes through the tube 18, into and through the connecting tube 31, into and through the tube 41 around the outside surfaces of the removable insert tube 51, which delivers the contrasting flavoring.

The amount of contrasting flavoring material being delivered from the hopper 44 is controlled by the size and number of the radial openings 57 in the insert tube 51. The flavoring material is received from the hopper 44 into the open top of the insert tube 51 under pressure, whereupon it will first entirely fill up the tube 51, forcing the bottom closure plug 62 into sealing position within the axial opening 61. The contrasting flavoring material, being under intermittent pressure and having no place to go after filling the tube 51, will pass intermittently through the radial openings 57 and into the intermittently moving stream of basic substance flowing around the outside of the insert tube 51 and within the discharge tube 41. Of course, it will be appreciated that since the basic substance is also under intermittent pressure, at the same times as the flavoring material, it will be flowing around the insert tube 51 within the discharge tube 41 only when the contrasting flavoring material is being forced through the openings 57. It will thus be apparent that the contrasting flavoring material flowing from the second source of supply will be discharged into the basic substance flowing from the first source of supply in a series of fine circumferentially spaced streams having a relatively small cross-sectional area as compared to the cross-sectional area of the combined or composite stream being discharged from the lower end of the discharge tube 41.

The ratio of flavoring material to basic substance is controlled, in the illustration shown, entirely by manipulation of the plug valve 21, which controls only the flow of basic substance. The number and size of the radial openings 57 in the insert tube 51 being fixed, there can be no adjustment of the amount of flow of the flavoring material unless a different sized insert tube is substituted having more or less or larger or smaller openings. It has never been found practical or feasible to attempt to control the ratio of the flavoring material to the basic substance by differences in pumping or feeding pressures since equal pressures are required on both substances for obtaining the optimum efficiency and result. However, each cup-filling machine has certain timed adjustments for controlling the volume flow of materials from the hoppers 13 and 44 within given limits.

Although I have only described in detail only one modification which the invention may assume, it will be readily apparent to those skilled in the art that various other modifications may be made therein without departing from the spirit thereof or from the scope of the invention.

What is claimed is:

1. A readily separable sanitary nozzle having a single open-top discharge tube for making variegated ice creams and the like which comprises means for attaching said nozzle to a source of supply for a basic substance and delivering said basic substance to a inlet intermediate the ends of said discharge tube, means mounted above said intermediate inlet for attaching said nozzle and discharge tube to a source of supply for a contrasting flavoring material, and a removable insert tube adapted to be mounted axially within the open-top of said discharge tube for receiving said flavoring material and conveying it to a discharge position beyond the inlet for said basic substance, said insert tube having a series of spaced radial openings whereby said flavoring material in said insert tube is distributed into the basic substance in said discharge tube in a series of streams of relatively small cross-sectional area as compared to the cross-sectional area of the composite stream.

2. A readily separable sanitary nozzle having a single open-top discharge tube for making variegated ice creams and the like which comprises means for attaching said nozzle to a source of supply for a basic substance and delivering said basic substance to a inlet intermediate the ends of said discharge tube, means including a plug-valve for reducing the size of the receiving opening from said source of supply for said basic substance, means mounted above said intermediate inlet for attaching said nozzle and discharge tube to a source of supply for a contrasting flavoring material, and a removable insert tube adapted to be mounted axially within the open-top of said discharge tube for receiving said flavoring material and conveying it to a discharge position beyond the inlet for said basic substance, said insert tube having a series of spaced holes whereby flavoring material in said insert tube is distributed into the basic substance in said discharge tube in a series of streams of relatively small cross-sectional area as compared to the cross-sectional area of the composite stream.

3. A readily separable sanitary nozzle having a single open-top discharge tube for making variegated ice creams and the like which comprises means for attaching said nozzle to a source of supply for a basic substance and delivering said basic substance to an inlet intermediate the ends of said discharge tube, means mounted above said intermediate inlet for attaching said nozzle and discharge tube to a source of supply for a contrasting flavoring material, and a removable insert tube adapted to be mounted axially within the open-top of said discharge tube for receiving said flavoring material and conveying it to a discharge position beyond the inlet for said basic substance, said insert tube having a series of spaced openings whereby said flavoring material in said insert tube is distributed into the basic substance in said discharge tube in a series of streams of relatively small cross-sectional area as compared to the cross-sectional area of the composite stream, said insert tube having means adjacent its lower end for maintaining it in axial alignment within said discharge tube.

4. A readily separable sanitary nozzle having a single open-top discharge tube for making variegated ice creams and the like which comprises means for attaching said nozzle to a source of supply for a basic substance and delivering said basic substance to a inlet intermediate the ends of said discharge tube, means mounted above said intermediate inlet for attaching said nozzle and discharge tube to a source of supply for a contrasting flavoring material, and a removable insert tube adapted to be mounted axially within the open-top of said discharge tube for receiving said flavoring material and conveying it to a discharge position beyond the inlet for said basic substance, said insert tube having a series of circumferentially spaced openings whereby said flavoring material in said insert tube is distributed into the basic substance in said discharge tube in a series of streams of relatively small cross-sectional area as compared to the cross-sectional area of the composite stream, said insert tube having a readily separable means closing its extreme lower end and having means adjacent its lower end for maintaining said insert tube in axial alignment within said discharge tube.

References Cited in the file of this patent

UNITED STATES PATENTS 2,099,252   Bagby ---------------- Nov. 16, 1937